June 24, 1930. A. E. ARMSTRONG 1,766,970
TRAP
Filed Oct. 7, 1927

INVENTOR
Adam E. Armstrong
BY Chappell & Earl
ATTORNEYS

Patented June 24, 1930

1,766,970

UNITED STATES PATENT OFFICE

ADAM E. ARMSTRONG, OF THREE RIVERS, MICHIGAN

TRAP

Application filed October 7, 1927. Serial No. 224,751.

The main objects of this invention are:

First, to provide an improved trap which is not likely to become air bound and one in which the valve is opened for the discharge of water only when a substantial volume of water has accumulated, that is, it does not dribble.

Second, to provide a trap which is simple and compact in structure and at the same time capable of handling relatively large quantities of water and is positive in operation.

Third, to provide an improved trap which is economical in structure and operates effectively under a great variety of conditions such as variations in pressure and the like.

Objects pertaining to details and economies of my invention will definitely appear from the detailed description to follow. The invention is clearly defined and pointed out in the claims.

A structure embodying the features of my invention is illustrated in the accompanying drawing, in which.

Figure 1:
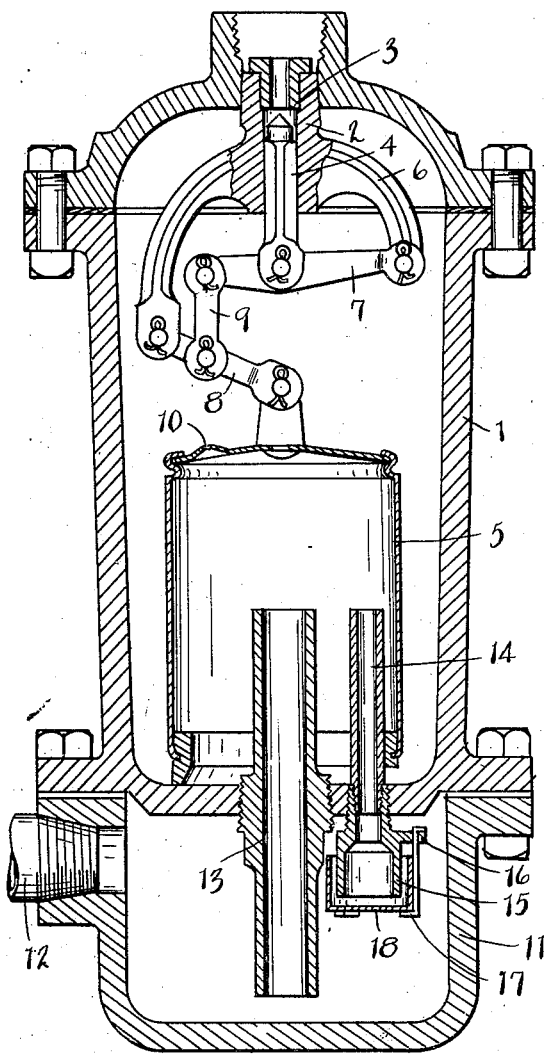
Fig. 1 is a view mainly in vertical section of a trap embodying the features of my invention.
Figure 2:
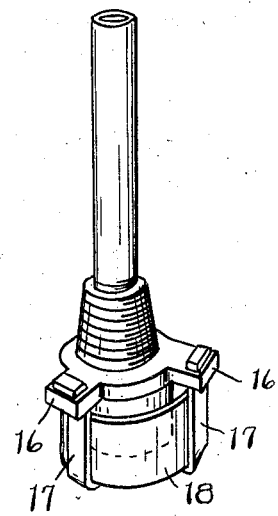
Fig. 2 is a perspective view of the vent pipe and vent valve of my improved trap.

Referring to the drawing, I provide a float chamber 1 adapted at its upper end to receive a discharge pipe or conduit and provided with a discharge valve which in the structure illustrated comprises a casing 2 carrying the valve seat 3. The valve 4 reciprocates in the casing and is operatively connected to the float 5 which is of the open inverted type shown in Letters Patent No. 1,309,604 granted to me July 15, 1919.

The valve carries a yoke 6, one arm of which is pivoted to the actuating lever 7, the valve being pivotally mounted on this lever. The float is connected to a lever 8 mounted on the other arm of the yoke, the lever 8 being connected to the lever 7 by means of the link 9. These parts are substantially the same as in my said patent.

The float 5 has a vent 10 in the top thereof. Below the float chamber is a separating chamber 11 having an inlet connection 12 at one side thereof. This separating chamber is connected to the float chamber by the tube or pipe 13 which depends into the separating chamber opening at a point adjacent the bottom thereof and projects centrally into the float chamber and into the inverted float 5.

Figure 3:
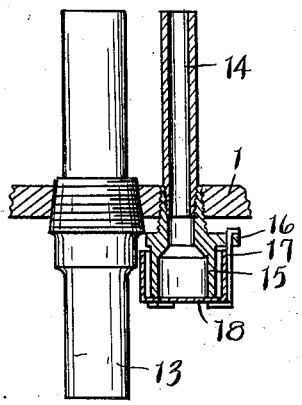
Fig. 3 is a detail section showing the vent valve in its closed position, it being shown in its normal open position in Fig. 1.

I also provide a vent pipe 14 which projects into the float, preferably being of the same height as the delivery pipe 13. This vent pipe has an enlarged mouth portion 15 depending into the separating chamber. This enlarged mouth portion 15 has radially projecting ears 16 carrying the valve cage members 17 which floatingly support the cup valve 18 to coact with the lower end of the vent pipe so that when the water in the separating chamber reaches a predetermined level it automatically closes this vent valve. The valve is shown in its closed position in Fig. 3.

The operation of the device is as follows: Assuming the trap to be discharging, that is, the valve open as shown in Fig. 1, when all the water is drawn from the separating chamber it is followed by steam which fills the bucket and closes the valve. The valve remains in its closed position until the next actuation.

As the water accumulates in the separating chamber it seals the lower end of the delivery pipe 13 but steam may pass into the float chamber through the vent to replace any that is condensed in the bucket or in the float chamber. When sufficient water has accumulated in the separating chamber to close the vent valve the passage of steam into the bucket and into the float chamber is cut off, allowing the steam in the float chamber and bucket to condense and permitting the float to fall, opening the discharge valve, and water is driven from the separating chamber until the lower end of the discharge conduit is uncovered. The pressure of the steam on the vent valve is sufficient to hold it closed until sufficient water has been discharged to allow the steam to enter the float chamber through the pipe 13 and the pressure becomes equalized in the float chamber and separating chamber and gravity acts to open the vent valve. The discharge valve is closed as soon as the flow of water ceases.

My improved trap is very positive and uniform in its operation, that is, it operates when a predetermined quantity of water is collected, and the float does not vibrate as is the case in other types of traps.

I have illustrated and described my improvements in the form in which I have embodied the same in practice. I have not attempted to illustrate or describe the same in other embodiments which are entirely practical, as with other types of floats, as it is believed the disclosure made will enable those skilled in the art to embody or adapt my improvements as may be desired.

Having thus described my invention what I claim as new and desire to secure by Letters Patent is:

1. In a trap, the combination of a float chamber provided with a discharge valve, an open inverted float provided with a vent at the top and operatively connected to said discharge valve, a separating chamber below said float chamber having an inlet connection, a delivery pipe for said separating chamber depending into said separating chamber and opening adjacent the bottom thereof and projecting upwardly into said float chamber within said float, a vent pipe connecting said separating chamber with said float chamber and projecting upwardly into said float, said vent pipe having an enlarged mouth depending into said separating chamber, a valve cage suspended from said vent pipe, and a cup-like valve embracing the lower end of said vent pipe and floatingly supported within said cage whereby the valve is closed by the water accumulated in said separating chamber.

2. In a trap, the combination of a float chamber provided with a discharge valve, a float operatively connected to said discharge valve, a separating chamber below said float chamber having an inlet connection, a delivery pipe for said separating chamber depending into said separating chamber and opening adjacent the bottom thereof, a vent pipe connecting said separating chamber with said float chamber, said vent pipe having an enlarged mouth depending into said separating chamber, and a floatingly supported cup-like valve embracing the lower end of said vent pipe whereby the valve is closed by the water accumulated in said separating chamber.

3. In a trap, the combination of a float chamber provided with a discharge valve, a float operatively connected to said discharge valve, a separating chamber below said float chamber having an inlet connection, a delivery pipe for said separating chamber depending into said separating chamber and opening adjacent the bottom thereof, a vent pipe connecting said separating chamber with said float chamber, and a floatingly supported cup-like valve embracing the lower end of said vent pipe whereby the valve is closed by the water accumulated in said separating chamber.

4. In a trap, the combination of a float chamber provided with a discharge valve, a float operatively connected to said discharge valve, a separating chamber below said float chamber having an inlet connection, a delivery pipe for said separating chamber depending into said separating chamber, a vent pipe connecting said separating chamber with said float chamber depending into said separating chamber, and a floatingly supported cup-like valve embracing the lower end of said vent pipe whereby the valve is closed by the water accumulated in said separating chamber.

5. In a trap, the combination of a float chamber having a discharge valve, a float open at its lower end operatively connected to said valve and having a vent in its upper end, a separating chamber below said float chamber and having an inlet connection, a discharge connection for said separating chamber to said float chamber, a vent connection for said separating and float chambers, and a water actuated valve for said vent connection whereby the vent connection is closed by the accumulating water in said separating chamber.

6. In a trap, the combination of a float chamber having a discharge valve, a float operatively connected to said valve, a separating chamber having an inlet connection, a discharge connection for said separating chamber to said float chamber, a vent connection for said separating and float chambers, and a water actuated valve for said vent connection whereby the vent connection is closed by the accumulating water in said separating chamber.

7. In a trap, the combination of a float chamber having a discharge valve, a float operatively associated with said discharge valve, a separating chamber provided with an inlet connection, a delivery connection for said separating chamber to said float chamber, a vent connection for said separating chamber and float chamber, and a normally open valve for said vent connection actuated to closed position by the accumulating of water within said separating chamber.

8. In a trap, the combination of a chamber having a discharge valve, means for operating said valve, a separating chamber having an inlet connection, a discharge connection for said separating chamber to said valve chamber, a vent connection for said separating and valve chambers, and a water actuated valve for said vent connection whereby the vent connection is closed by the accumulation of water in said separating chamber.

In witness whereof I have hereunto set my hand.

ADAM E. ARMSTRONG.